United States Patent
Panzer et al.

(10) Patent No.: US 8,908,931 B2
(45) Date of Patent: Dec. 9, 2014

(54) USING PHOTOGRAPHS TO MANAGE GROUPS

(71) Applicant: Google Inc., Mountain View, CA (US)

(72) Inventors: John R. Panzer, Mountain View, CA (US); Kevin Brown, Bothell, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/053,509

(22) Filed: Oct. 14, 2013

(65) Prior Publication Data

US 2014/0064572 A1 Mar. 6, 2014

Related U.S. Application Data

(63) Continuation of application No. 13/168,474, filed on Jun. 24, 2011, now Pat. No. 8,582,828.

(51) Int. Cl.
| | |
|---|---|
| *G06K 9/00* | (2006.01) |
| *G06K 9/62* | (2006.01) |
| *G06F 17/30* | (2006.01) |
| *G06Q 50/00* | (2012.01) |
| *G06Q 10/10* | (2012.01) |

(52) U.S. Cl.
CPC ...... *G06K 9/00885* (2013.01); *G06F 17/30244* (2013.01); *G06K 9/00677* (2013.01); *G06Q 50/01* (2013.01); *G06Q 10/10* (2013.01)
USPC .......................................... 382/115; 382/225

(58) Field of Classification Search
None
See application file for complete search history.

(56) References Cited

U.S. PATENT DOCUMENTS

| | | | |
|---|---|---|---|
| 7,203,367 B2 * | 4/2007 | Shniberg et al. | 382/224 |
| 2009/0157693 A1 | 6/2009 | Palahnuk | |
| 2010/0325218 A1 | 12/2010 | Castro et al. | |
| 2011/0021145 A1 | 1/2011 | Johnson et al. | |
| 2011/0069179 A1 | 3/2011 | Bathiche et al. | |

OTHER PUBLICATIONS

International Search Report, dated Aug. 23, 2012 (Application No. PCT/US12/37951, filed May 15, 2012).

* cited by examiner

*Primary Examiner* — Daniel Mariam (57) ABSTRACT

In one implementation, a computer-implemented method includes receiving, at a computer system, an electronic photograph; and identifying, by the computer system, a plurality of users of depicted in the electronic photograph. The computer-implemented method can also include designating a group of users based on the identified plurality of users; and providing information regarding the designated group of users to one or more computing devices associated with one or more of the plurality of users.

20 Claims, 6 Drawing Sheets

USING PHOTOGRAPHS TO MANAGE GROUPS

CROSS-REFERENCE TO RELATED APPLICATION

The present application is a continuation of U.S. patent application Ser. No. 13/168,474, filed on Jun. 24, 2011, which is hereby incorporated by reference in its entirety.

TECHNICAL FIELD

This document generally describes techniques, methods, systems, and computer program products for using photographs to manage groups of users.

BACKGROUND

Social networks are computer-based systems that allow users (e.g., geographically separated users) to interact with each other through computing devices, such as laptop computers, desktop computers, mobile computing devices (e.g., smartphones, cell phones, and personal digital assistants (PDA)), netbooks, and/or tablet computing devices. Users can interact with each other on a social network in a variety of ways, such as by sending messages to each other, posting comments, sharing content (e.g., links to web pages, videos, and images), and/or designating acquaintance relationships on a social network (e.g., friend relationship, colleague relationship, group member, or follower relationship).

Users can manually create groups of users on social networks, such as a group for users who are on a sports team or a group for users who are part of a work-related organization. Group membership can allow a user who is part of a group to access content that is designated for the group (e.g., shared with the group, tagged with an identifier of the group), such as photos, event information, and messages. Manual creation of a group of users can involve a user manually selecting users to add to the group from a collection of users on a social network (e.g., list of friends). A created group of users on a social network can also be manually modified in order to track changes to the underlying group (e.g., sports team, or work organization), such as a new user joining an organization.

SUMMARY

This document describes techniques, methods, systems, and computer program products for using electronic photographs (e.g., electronic image created by a digital camera) to manage groups of users. Electronic photographs can serve as a guide for creating and modifying groups of users. For instance, users who are part of a group, such as a sports team, may be photographed together, such as in a photograph of the sports team line up on the field. Photographs can be analyzed to identify users, and groups can be created and/or modified based on the identified users.

In one such example, a user takes a digital photograph of her family, uploads the photograph to a computer system, and requests that the computer system create a group from the photograph. The computer system can use any of a variety of techniques to identify people depicted in the photograph, such as facial recognition techniques, and can provide a proposed group to the user based on the identified users. Based on whether the user and/or one or more of the identified users consent to being included in the group, the computer system can create the group to include the identified users and, in some implementations, the user who uploaded the photograph. The users included in the group can then proceed with using the group designation to perform various actions with regard to the group, such as sharing content with the members of the group (e.g., designating photographs and videos on the computer system as being only accessible to members of the group).

Groups can be modified based on electronic photographs. For example, if a group for a soccer team had previously been established by a user as including user A-user K, and a new photograph is received that includes user A-user L, the group can be modified to additionally include user L. Such modifications can include both user additions to a preexisting group and subtractions from a preexisting group. A photograph can be analyzed to identify a preexisting group to which the photograph may pertain and, based on the users identified in the photograph, various modifications (e.g., user additions, user subtractions) to the preexisting group can be proposed. For instance, users can be identified as being depicted in an electronic photograph and compared to the users included in previously-designated groups of users. If there is at least a threshold overlap between the identified users and users included in a preexisting group, the preexisting group may be suggested for modification (i) if there are users identified in the photograph who are not already included in the preexisting group and/or (ii) if there are users included in the preexisting group who are not identified in the photograph. User consent may be required for a user to be added to and/or removed from a group.

Groups of users can be labeled using information from the photographs. For example, if a group of photographs is stored in a folder on a computer or on a social networking site under a folder called "Soccer 2005," and another group of photographs that includes people who largely overlap with people in the first folder are stored in a folder "Soccer Tournament," the group of users may be given a label of "Soccer." The user who is employing the techniques described here may then accept that label or edit it when they are first forming the group or updating the group.

In one implementation, a computer-implemented method includes receiving, at a computer system, an electronic photograph; and identifying, by the computer system, a plurality of users of depicted in the electronic photograph. The computer-implemented method can also include designating a group of users based on the identified plurality of users; and providing information regarding the designated group of users to one or more computing devices associated with one or more of the plurality of users.

In another implementation, a computer-implemented method includes receiving, at a computing device, user input that indicates a request for a group of users to be designated based on an electronic photograph; and in response to receiving the user input, obtaining proximity information for one or more other computing devices that were physically located within a threshold distance of the computing device within a threshold amount of time of the electronic photograph being taken. The computer-implemented method can also include providing a request to a computer system for a group of users to be designated based on the electronic photograph and the obtained proximity information; and receiving information indicating that the group of users has been designated by the computer system to include the plurality of users identified based on the electronic photograph and the proximity information.

In another implementation, a system includes a computer system and an interface to the computer system to receive an electronic photograph. The system can further include a user identification module of the computer system to identify a plurality of users depicted in the electronic photograph; and a group manager of the computer system to designate a group of users based on the plurality of users identified by the user identification module. As part of the system, the interface can further provide information regarding the designated group of users to one or more computing devices associated with one or more of the plurality of users.

The details of one or more embodiments are set forth in the accompanying drawings and the description below. Various advantages can be provided by the disclosed techniques, methods, systems, and computer program products. For example, users can more easily create and maintain groups. Users may find manual group management tasks, such as creating and/or updating groups, to be tedious and, as a result, may not perform them. For instance, to manually create a group, a user would select and/or enter identifying information for each of the members of a group, such as entering an email address for each member of the group. However, such barriers can be reduced and/or eliminated through automated group management using electronic photographs. For instance, groups can be automatically generated and maintained for users based on their photographs—a user merely has to provide a photograph from which a group of users can be created and/or updated.

In another example, erroneous and/or spam-based additions to groups can be minimized by verifying the identity of users depicted in a photograph before adding users to a group. For instance, a user could be misidentified in an electronic photograph, or an image of a user could be inserted into a photograph and the user could be identified as being part of a group depicted in the photograph. A variety of information associated with users depicted in an electronic photograph can be used to verify their identity, such as geographic location information for users identified in a photograph within a threshold amount of time of the photograph having been taken. For example, if users A-D are identified in a photograph taken at time X and users A-C were at the same geographic location within a half hour of time X, then the identity of users A-C can be verified and used for creating/updating a group. Such verification techniques can help to maintain the integrity of group membership.

Other features, objects, and advantages of the invention will be apparent from the description and drawings, and from the claims.

DESCRIPTION OF DRAWINGS

Like reference symbols in the various drawings indicate like elements.

DETAILED DESCRIPTION

This document generally describes techniques, methods, systems, and computer program products for managing groups of users based on electronic photographs. Individuals can be identified in electronic photographs and groups can be designated based on the identified individuals. Certain individuals might be identifiable because they are registered users of an on-line computing service who have submitted their portrait photographs to the service and have consented to such use of their photographs, while others might not be identifiable, such as if they are not registered with the system. Various techniques can be used to identify users depicted in electronic photographs, such as facial recognition techniques and/or obtaining metadata for an electronic photograph, such as tags identifying items and/or users depicted in a photograph. A variety of information can also be used to verify the identity of users depicted in electronic photographs, such as information indicating the proximity of users depicted in a photograph at or around at time when the photograph was taken. A variety of information associated with users and their computing devices can provide indications as to the users' proximity to one another, such as geographic location information (e.g., global positioning system (GPS) coordinates of a user's mobile computing device), local communication between computing devices (e.g., near field communication between devices, devices connected to the same local area network (LAN)), and/or physical contact registered between devices (e.g., users performing a "bump" with their devices).

Figure 1:
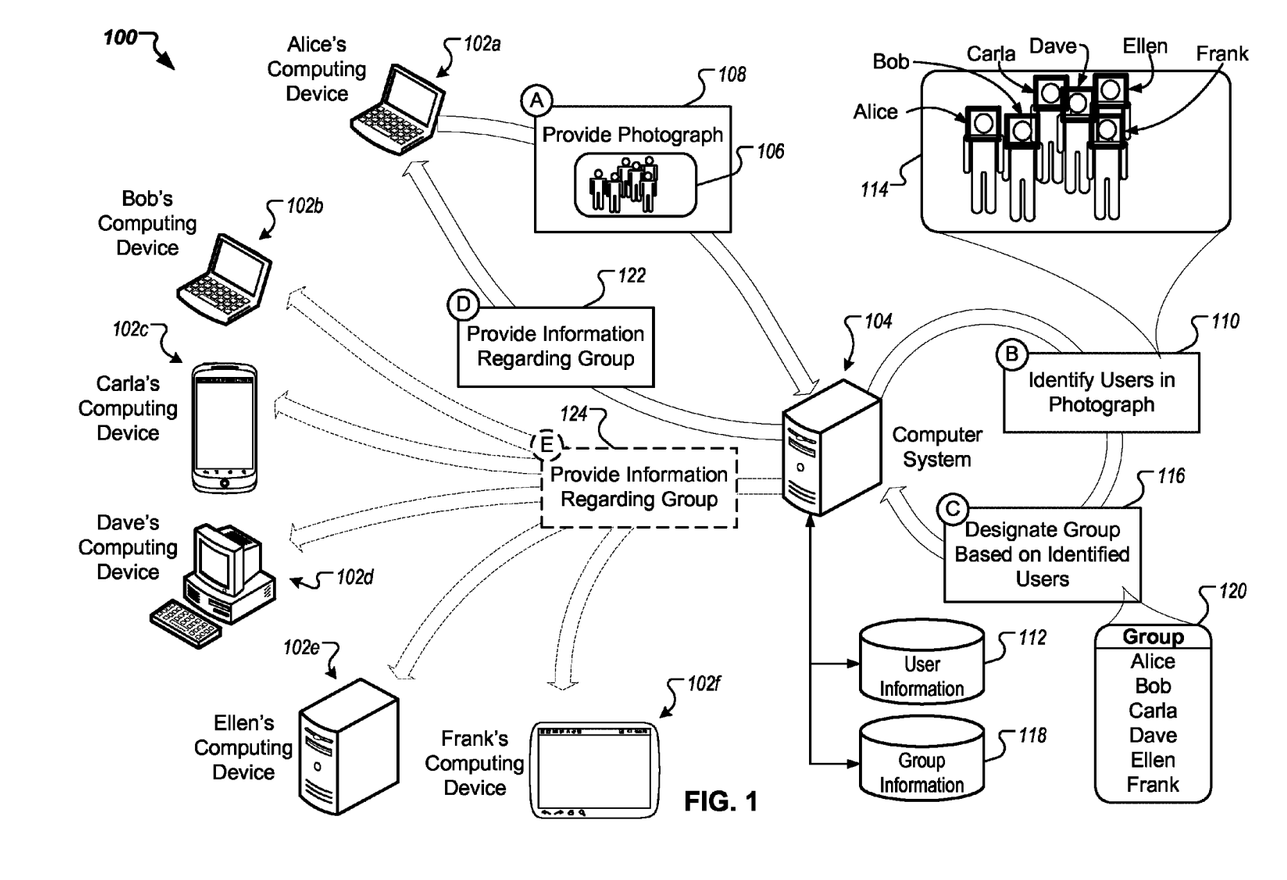
FIG. 1 depicts a conceptual diagram of an example system for designating a group based on an electronic photograph.

FIG. 1 depicts a conceptual diagram of an example system 100 for designating a group based on an electronic photograph. The example system 100 includes computing devices 102a-f, which are associated with users depicted in an electronic photograph, and a computer system 104 that manages groups based on electronic photographs. The computing devices 102a-f are associated with example users Alice (102a), Bob (102b), Carla (102c), Dave (102d), Ellen (102e), and Frank (102f), respectively. The computing devices 102a-f can be any of a variety of appropriate computing devices, such as laptop computers (e.g., 102a and 102b), desktop computers (e.g., 102d), computer server systems (e.g., 102e), mobile computing devices (e.g., smartphones (e.g., 102c), cell phones, personal digital assistants (PDAs)), and/or tablet computing devices (e.g., 102f). The computer system 104 can be any of a variety of appropriate computing device as well, such as one or more computer servers. The computing devices 102a-f and the computer system 104 can communicate with each other over one or more networks, such as the Internet, LAN, wide area network (WAN), virtual private network (VPN), wireless network, cellular network, 3G/4G network, fiber optic network, or any combination thereof.

In the depicted example system 100, the computing device 102a associated with user Alice provides an electronic photograph 106 to the computer system 104, as indicated by step A (108). The electronic photograph 106 is a digital image file (e.g., JPEG formatted image file, portable network graphic (PNG) formatted image file, raw formatted image file) that can be generated by one or more digital cameras (e.g., digital single lens reflex (SLR) camera, point and shoot digital camera, web camera, digital camera embedded in a computing device). The electronic photograph 106 can created by the computing device 102a (e.g., photograph taken by a digital camera that is part of or attached to the computing device 102a) and/or downloaded to the computing device 102a (e.g., downloaded from a digital camera connected to the computing device 102a). The electronic photograph 106 can include metadata that provides various details regarding the photograph, such as information indicating a time and/or geographic location at which the photograph was taken. Such metadata can also include user annotations to the photograph 106, such as tags that identify items (e.g., users, objects, scenery) depicted in the photograph 106.

The computer system 104 can receive the photograph 106 from the computing device 102a over one or more communication networks (e.g., Internet, wireless network). The computer system 104 can use the photograph 106 to designate a group of users (e.g., create a group of users, modify a group of users). In response to receiving the photograph 106 and/or in response to receiving a request to designate a group based on the photograph 106 (e.g. a request from the computing device 102a associated with user Alice), the computer system 104 can identify users depicted in the electronic photograph 106, as indicated by step B (110).

The computer system 104 can use a variety of techniques to identify users depicted in the photograph 106, such as facial recognition techniques (e.g., geometric and/or photometric facial recognition algorithms) and/or metadata associated with the photograph 106 (e.g., tags provided for the photograph 106 by the user Alice that identify one or more people depicted in the photograph 106). The computer system 104 can access a user information data repository 112 to assist in identifying users depicted in the photograph 106. The user information data repository 112 can include information associated with users of the computer system 104, such as photos previously indicated as depicting particular users, information identifying computing devices that are associated with particular users, and/or information associating users with particular unique identifiers (e.g., social network identifier, email address).

In some implementations, the computer system 104 is part of a social network system and the user information 112 includes social network information for users, such as electronic photographs posted to the social network, acquaintance relationships among users (e.g., friend relationship designation, colleague relationship designation, follower relationship designation), and/or interactions between users (e.g., electronic messages sent between users, posted comments). The set of users from which the people depicted in the photograph 106 are identified can initially include acquaintances (e.g., friends, friends of friends) of a user requesting the group be designated from the photograph 106 (e.g., Alice) and can expand to include additional users (e.g., other non-acquaintances on a social network) if people depicted in the photograph 106 are not identified from the set of acquaintances.

The image 114 shows a magnification of the photograph 106 with the users Alice, Bob, Carla, Dave, Ellen, and Frank having been identified by the computer system 104.

The computer system 104 can designate a group of users based on the users identified in the photograph 106, as indicated by step C (116). For example, the computer system 104 can designate a group that includes the users that are identified in the photograph 106. A group can be designated in a variety of ways. The computer system 104 can use a group information data repository 118 to persistently maintain information regarding groups and users who are members of particular groups. For example, the group information data repository 118 can include a database table that stores group information (e.g., group id, group name) and another database table that stores group membership information (e.g., user id, group id). In such an example, a group can have one entry in the group information table and an entry for each member of the group in the group membership table. Various other data structures can be used to organize and persistently store information regarding groups in the group information data repository 118, such as hash tables, binary trees, and/or flat files. Designating a group can involve populating the group information data repository 118 with information that creates a new group that includes, at least, the users identified from the electronic photograph 106.

In the depicted example, group 120 is designated by the computer system 104 as including the users Alice, Bob, Carla, Dave, Ellen, and Frank, who were each identified in the photograph 106.

Although not depicted in the present example, the computer system 104 may designate groups based on information other than the electronic photograph 106. For example, the computer system 104 may identify photographs that are related to the photograph 106 and designate a group based on users identified across the related photographs. For instance, a series of photographs, including the photograph 106, may have been taken at an event. Users identified from other photographs taken at the event may also be included in the designated group. The computer system 104 may identify other related photographs in a variety of ways. For example, the user information data repository 112 can include other photographs that users have provided to the computer system 104, such as photographs that users have added to their social network profile. Such photographs may be organized into collections (e.g., albums) and the computer system 104 can infer that photographs contained within a collection are related. In another example, the computer system 104 can identify other photographs as being related based on metadata, such as a time and/or location at which photographs were taken. In a further example, the computer system 104 can identify other photographs as being related if they contain similar groupings of users, such as a photograph depicting users Alice, Bob, Carla, Dave, Ellen, Frank, and Steve; and another photograph depicting users Bob, Carla, Dave, Ellen, Frank, and Steve.

In another example, the computer system 104 can use social network information to designate groups in addition to photographs. For instance, the computer system 104 can identify other users who are not depicted in the photograph 106 based on the other users having social network relationships with the users identified in the photograph 106 as social network relationships that the identified users have with each other. For example, if there are family relationships (e.g., parent, sibling, cousin) designated between the identified users (Alice, Bob, Carla, Dave, Ellen, and Frank) and there are other users who are not depicted in the photograph 106 but who have similar family relationships with some or all the identified users, then the computer system 104 may add such other users to the designated group.

As part of designating a group, the computer system 104 can provide a name for the group. Such a name can be based on information associated with the photograph 106, such as a name of the photograph 106 and/or a name of an album of which that the photograph 106 is a part. For instance, if the photograph 106 is named "soccer team.jpg," the computer system 104 can propose the name "Soccer Team" for the group 120. In another example, if the photograph 106 is included in an album entitled "Smith Family Reunion," the computer system 104 can propose the name "Smith Family" for the group 120. Other techniques can be used to provide a name for the group 120, such as identifying objects depicted in the photograph 106 (e.g., soccer ball) and proposing a name for the group 120 based on the identified objects (e.g., "Soccer").

As indicated by step D (122), the computer system 104 can provide information regarding the designated group 120 to the computing device 102a that provided the photograph 106 and/or requested that a group be designated based on the photograph 106. The information provided to the computing device 102a can include information identifying the users who are members of the group and/or a name for the group. The information can serve as a proposal for the creation of the group 120 and can request that the user (Alice) provide approval for the group 120 before it is created. For instance, the information can include code that, when executed on the computing device 102a, provides a user interface (UI) that includes a list of the users included in the group and buttons that the user can select to approve, manually modify, and/or disapprove of the proposed group. Selection of such buttons can cause the computing device 102a to provide further instructions to the computer system 104 indicating whether the group 120 should be created, modified, or deleted.

In some implementations, the computer system 104 provides information regarding the group 120 to computing devices 102b-f that are associated with each of the identified users, as indicated by step E (124). Such information can include information informing the user that the computer system 204 has identified the user for addition to a group and can request that the user provide authorization before the user is added to the group. The information provided to the users (Bob, Carla, Dave, Ellen, and Frank) associated with the computing devices 120b-f can be similar to the information provided to the user (Alice) associated with computing device 120a. To protect user privacy, the computer system 104 may not add users to the group 120 until they have provided their consent to be part of the group 120—users may only be added to a groups for which they have provided their consent. The information may be provided to the computing devices 102b-f in a variety of ways, such as through various messaging mechanisms (e.g., text message, email) and/or provided with content requested from the computer system 104 by the devices 102b-f. For instance, the information indicating that the users identified in the photograph 106 have been added to a group of users can be provided as content on a web page requested from the computer system 104 by the computing devices 102b-f after the group 120 is designated on the computer system 104.

Once the group 120 is created (and the users Alice-Frank have consented to being part of the group 120), the users Alice-Frank can use the group 120 to interact with each other, such as posting content to the computer system 104 that is made only available to members of the group 120.

In addition to or instead of electronic photographs, the computer system 104 can use other content depicting users to manage groups, such as electronic videos. For example, the computer system 104 can receive electronic videos from the computing devices 102a-f, identify users depicted in the videos (e.g., analyzing frames of the videos in a similar manner to identifying users depicted in the photograph 106), and designate groups based on the identified users.

In some implementations, the computer system 104 can be part of one or more of the computing devices 102a-f. For example, the computing device 102a can be configured to identify users in the photograph 106 (step B), to designate the group 120 based on the identified users (step C), to provide information regarding the designated group to the user (Alice) of the device 102a (step D), and to provide information regarding the group to computing devices associated with the identified users (step E).

Figure 2:
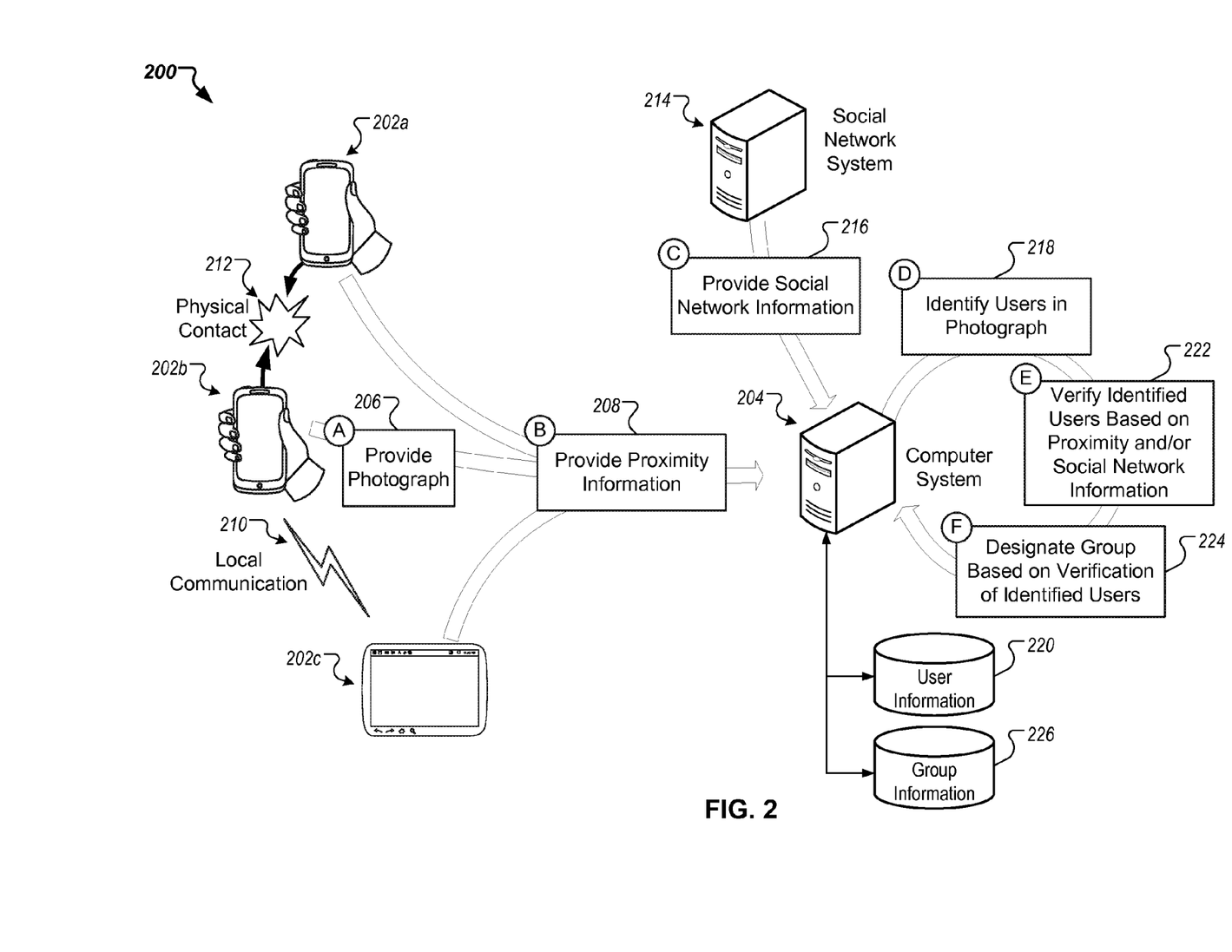
FIG. 2 depicts a conceptual diagram of an example system for verifying users identified in an electronic photograph.

FIG. 2 depicts a conceptual diagram of an example system 200 for verifying users identified in an electronic photograph. As explained above, users identified in an electronic photograph (or video) can be verified before they are included as members of a group. Such verification can help to alleviate users being incorrectly added to groups, for instance, based on misidentification and/or based on spam (e.g., doctored photographs that include images of users obtained from various public/semi-private sources, such as social network profile pages).

The system 200 includes computing devices 202a-c, which can be similar to the computing devices 102a-f described above with regard to FIG. 1. The example computing devices 202a-b are smartphones (example mobile computing devices) and the example computing device 202c is a tablet computing device. Any of a variety of appropriate computing devices can be used. The system 200 also includes a computer system 204, which can be similar to the computer system 104 described above with regard to FIG. 1. The computing devices 202a-c and the computer system 204 can communicate over one or more communication networks, such the Internet and/or wireless networks.

In the depicted example system 200, the computing device 202b provides an electronic photograph to the computer system 204, as indicated by step A (206), which is similar to step A (108) described above with regard to FIG. 1. For example, the computing device 202b can take the electronic photograph using a digital camera embedded in the device and can provide the photograph to the computer system 204 to create a group of users.

At or around the time when the electronic photograph is taken and/or provided to the computer system 204, proximity information for the computing device 202b and for other computing devices physically located near the computing device 202b can be obtained and/or provided to the computer system 204, as indicated by step B (208). Proximity information is information that indicates whether computing devices are physically located near each other. Proximity information can be used by the computer system 204 to verify users identified in electronic photographs.

A variety of information can serve as proximity information. For example, information indicating that computing devices are communicating over a local connection can provide an indication that the computing devices are physically proximate each other. Local communication connections can include a variety of connections that, by their nature, require the communicating computing devices to be physical located near each other, such as a BLUETOOTH connection, near field communication between computing devices, communication over a LAN, and/or communication over a wireless LAN, such as a Wi-Fi network using one or more of the 802.11 standards (e.g., 802.11g, 802.11n).

In the depicted example system 200, the computing device 202b has a local communication connection 210 with the computing device 202c. The proximity information provided to the computer system 204 by the computing device 202b at step B (208) can include information identifying a local connection to the computing device 202c. Such identifying information can include information uniquely identifying the device 202c (e.g., unique identifier on the computer system 204 for the device 202c) and/or a user associated with the device 202c (e.g., social network identifier, identifier for the user on the computer system 204, email address). The computing device 202c can provide proximity information regarding the local connection 210 to the computer system 204 at step B (208).

In another example, proximity information can include physical contact between computing devices. Such physical contact between computing devices can include users "bumping" their devices together so as to indicate user intent for the devices and/or users associated with the devices to be somehow linked together (e.g., share contact information between the bumped devices).

Physical contact between computing devices can be identified in a variety of ways. For example, computing devices can be configured to, in response to sensing physical contact through one or more sensors (e.g., accelerometer(s)), provide information to a computer server system, such as the computer system 204, indicating that physical contact has occurred. The provided information can include a variety of information regarding the contact, such as a time at which the physical contact occurred, information indicating a geographic location at which the contact occurred (e.g., GPS information), and/or characteristics of the physical contact (e.g., sensor output at or around the time of the contact). The computer server system to which the information regarding the physical contact is provided can receive information indicating physical contact from various computing devices that have sensed likely physical contact and can pair devices based on the received contact information. For instance, two computing devices that register contact at the same time in the same geographic location can be paired together. Mobile devices that have been paired based on physical contact can receive an indication that they have been paired and/or information identifying the one or more other devices to which they have been paired, such as internet protocol (IP) addresses for the other devices and/or identifiers for users associated with the other devices (e.g., social network identifier, email address).

Example physical contact 212 between the computing device 202a and the computing device 202b is depicted in FIG. 2. The proximity information provided by the computing device 202a and/or the computing device 202b at step B (208) can include information indicating that the physical contact 212 has occurred and/or information identifying a device with which the physical contact was made. For instance, in some implementations that computer system 204 can pair computing devices that have registered physical contact with each other and the proximity information provided to the computer system 204 by the computing devices 202a-b can include information describing the physical contact, as described in the previous paragraph. In some implementations, another computer system can pair devices that have detected physical contact and provide information identifying one or more computing devices (and/or users associated with such computing devices) to which they have been paired. In such implementations, the proximity information provided to the computer system 204 by the computing device 202b can include information identifying the computing device 202a (and/or a user associated with device 202b) as having physically contacted the computing device 202b. The computing device 202a can provide similar identifying information to the computing device 204 regarding the computing device 202b and/or an associated user.

In another example, proximity information can include information that indicates geographic locations of computing devices, such as GPS information. For instance, the computing devices 202a-c can each include one or more GPS units to identify GPS coordinates for the computing devices 202a-c based on GPS signals from satellites orbiting the Earth. The GPS coordinates for the computing devices 202a-c can be provided to the computer system 204 as proximity information at step B (208).

Other types of proximity information not explicitly described above and/or combinations of different types of proximity information can be provided by the computing devices 202a-c to the computer system 204. For instance, the computing devices 202a-c can provide information identifying one or more cellular towers to which they are connected.

The system 200 can additionally include a social network computer system 214 that manages and provides users with access to one or more social networks. The social network system 214 can be a collection of computing devices, such as a distributed network of computer server systems to serve various requests for access one or more social networks that are hosted by the social network system 214. The social network system 214 can provide social network information to the computer system 204, as indicated by step C (216). The social network information can a variety of information, such as information identifying various acquaintance relationships (e.g., friends, friends of friends, follower, fan) between users of the social network system 214. The social network information provided by the social network system 214 can be used in conjunction with or instead of the proximity information provided in step B (208) to verify users identified in electronic photographs.

Similar to step B (110) described above with regard to FIG. 1, the computer system 204 can identify users depicted in the electronic photograph provided by the computing device 202b, as indicated by step D (218). The computer system 204 can access information from a user information data repository 220 to perform the user identification. The user information data repository 220 can be similar to the user information data repository 112 described above with regard to FIG. 1.

The computer system 204 can verify the identified users based on the received proximity information provided by the computing devices 202a-c and/or the social network information provided by the social network system 214, as indicated by step E (222). Verification can involve determining whether there is at least a threshold probability that the identified users were photographed together at the time the electronic photograph was taken. Such a probability can be determined based on a variety of factors, such as the social network information from the social network system 214 and/or the proximity information from the computing devices 202a-c.

For example, assume that a user associated with computing device 202a is identified in the electronic photograph provided to the computer system 204 in step A (206); that the proximity information associated with the computing device 202a indicates that the device 202a and, by inference, the user associated with the device 202a were a large distance (e.g., hundreds of miles away) from a physical location at which the electronic photograph was taken; and that the user associated with the device 202a has no connection on one or more social networks to other users identified in the electronic photograph. In such an example, the user associated with the device 202a can be determined to have less than a threshold probability of actually having been part of the group of people depicted in the electronic photograph—the electronic photograph may be spam. For such an example, the user associated with the device 202a is likely to not be verified as being in the electronic photograph.

In another example, assume that a user associated with computing device 202c is identified in the electronic photograph provided to the computer system 204 in step A (206); that the proximity information associated with the computing device 202c indicates that the device 202c and, by inference, the user associated with the device 202c were located within a threshold distance of a physical location at which the electronic photograph was taken; and that the user associated with the device 202c has either a friend or a "friend of friend" relationship on one or more social networks with each of the other users identified in the electronic photograph. In such an example, the user associated with the device 202c can be determined to have at least a threshold probability of actually having been part of the group of people depicted in the electronic photograph—the user can be verified for the electronic photograph.

Verification can be performed by the computer system 204 for each of the users identified in an electronic photograph. If no one or more users are unable to be verified, the computer system 204 may halt designation of a group from the photograph until additional verification can be provided by a user who is requesting that a group be designated from the photograph, from one or more of the users identified and verified in the photograph, and/or from the unverified users. Additional verification can involve requesting that one or more of the aforementioned users provide information that verifies the users identified in the electronic photograph, such as naming each of the users depicted in the photograph and/or identifying a date and/or location at which the photograph was taken. In some implementations, a failure to verify each of the identified users will cause the computer system 204 to inform a user requesting creation of the group that the group cannot be designated and that the user will can manually designate the group. In some implementations, a failure to verify each of the identified users will cause the computer system 204 to designate the group without the verified users. Other implementations are also possible.

As indicated by step F (224), the computer system 204 can designate a group based on verification of the identified users as described with regard to step E (222). Such group designation can be performed in a similar manner as described above with regard to step C (116) in FIG. 1. Information regarding designated groups can be stored in a group information data repository 226, which can be similar to the group information data repository 118 described above with regard to FIG. 1. Although not depicted, the computer system 204 can proceed with providing information to the computing devices 202a-c regarding designated groups, similar to the step D (122) and step E (124) described above with regard to FIG. 1.

Although steps A-F (206-224) are described in a particular order above, they can performed in any of a variety of orders (and/or concurrently) by the computer system 204. For example, the proximity information 208 may be requested from the computing devices 202a-c by the computer system 204 in response a user associated with the computing devices 202a-c being identified in an electronic photograph.

Figure 3:
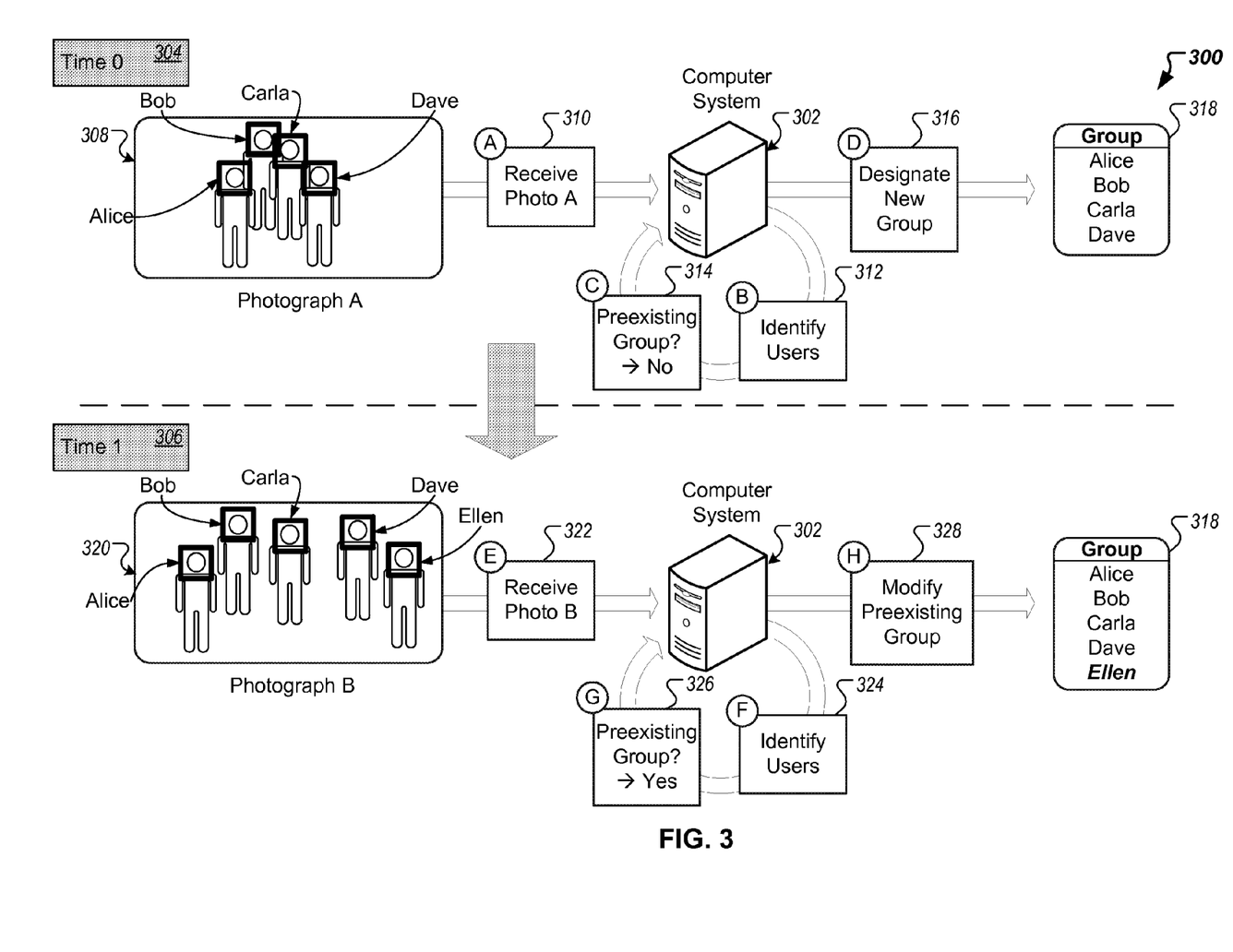
FIG. 3 depicts a conceptual diagram of an example system for modifying a group based on electronic photographs.

FIG. 3 depicts a conceptual diagram of an example system 300 for modifying a group based on electronic photographs. A computer system 302 is depicted as designating a group of users based on an electronic photograph received at time 0 (304) and subsequently modifying the previously designated group based on a second photograph received at time 1 (306). The computer system 302 can be similar to the computer systems 104 and/or 204 described above with regard to FIGS. 1 and 2, and can be any of a variety of appropriate computer systems, such as laptop computer, a mobile computing device, and/or a distributed server system.

At time 0 (304), photograph A (308) is received by the computer system 302, as indicated by step A (310). Like step B (110) described above with regard to FIG. 1, the computer system 302 identifies users depicted in photograph A (308), which in the present example includes Alice, Bob, Carla, and Dave. Although not depicted, verification of the identified users can be performed by the computer system 302, as described above with regard to FIG. 2.

As indicated by step C (314), the computer system 302 can determine whether there is a preexisting group of users that should be modified based on the photograph A (308). Such a determination can be based on a comparison of the identified users in photograph A (308) and users that are included in preexisting groups that have already been designated. If there is at least a threshold overlap between the identified users and users included in a preexisting group (e.g., 66%/75%/80%/90% of identified users included in a preexisting group, no more than one/two/three/five of the identified users missing from preexisting group), then the preexisting group can be selected for modification based on the photograph A (308). In the present example, the computer system 302 does not identify a preexisting group for modification based on the photograph A (308).

Based on the determination made in step C (314), the computer system 316 designates a new group of users using the identified users from the photograph A (308), as indicated by step D (316). In the present example, the computer system 302 designates group of users 318 as including the users identified in the photograph A (308).

Referring to time 1 (306), a second photograph B (320) is received by the computer system 302, as indicated by step E (322). The second photograph B (320) includes the users depicted in the previously received photograph A (308) as well as user Ellen. Like step B (312), the computer system 302 proceeds to identify users depicted in photograph B (320), as indicated by step 324. The computer system 302 determines whether there is a preexisting group of users that should be modified based on the photograph B (320), as indicated by step G (326). In the present example, the computer system 302 identifies the group 318 as being a candidate for modification based on the members of the group 318 (Alice, Bob, Carla, and Dave) being identified in the photograph B (320) and the photograph B (320) depicting one additional user (Ellen)—a 80% overlap between the group 318 and the users identified in photograph B (320).

In response to identifying the group 318 in step G (326), the computer system modifies the group 328 based on the users identified in the photograph B (320). For instance, the computer system 302 adds the user Ellen to the group 318.

In addition to modifying a group by adding users, as depicted in FIG. 3, the computer system 302 can modify a group by removing users. For instance, if a user that is a member of a group has not appeared or been mentioned in content (e.g., photographs, videos, group messages) related to the group within a threshold amount of time (e.g., one year, two years, five years), the computer system 302 can select such a user for removal from the group.

Figure 4:
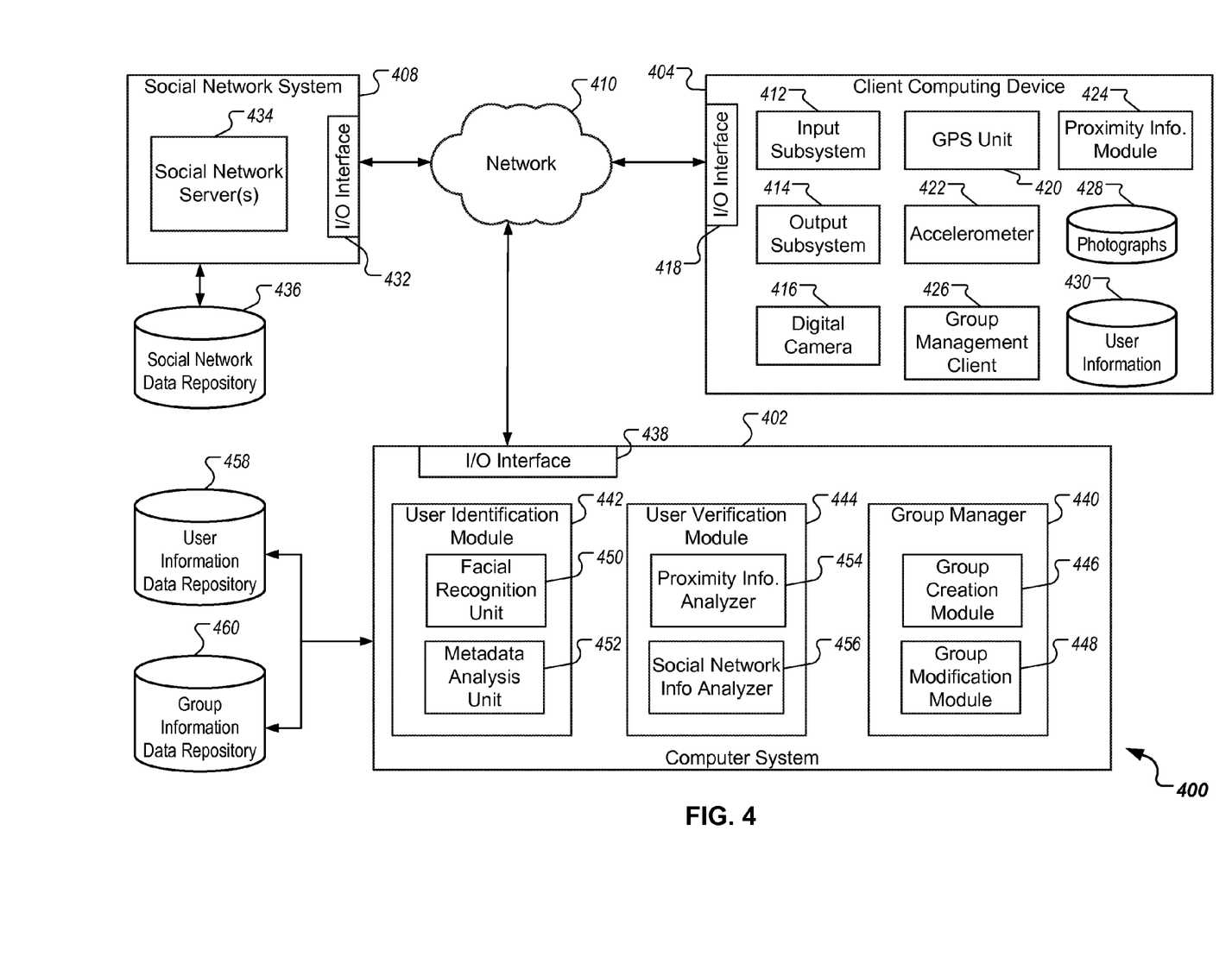
FIG. 4 is a block diagram of an example system for managing groups of users based on electronic photographs.

FIG. 4 is a block diagram of an example system 400 for managing groups of users based on electronic photographs. The example system 400 includes a computer system 402 that manages groups based on electronic photographs. The computer system 402 can be any of a variety of appropriate computer systems, such as the computer systems 104, 204, and/or 302 described above with regard to FIGS. 1-3, respectively. The system 400 can also include one or more client computing devices 404 that provide instructions to the computer system 402 regarding management of groups based on one or more electronic photographs. The client computing device 404 can be any of a variety of appropriate computing device, such as the computing devices 102a-f and/or 202a-c described above with regard to FIGS. 1-2, respectively.

The system 400 can further include a social network system 408 that provides information to the computer system 402 regarding one or more social networks hosted by the social network system 408. The social network system 408 can similar to the social network system 214 described above with regard to FIG. 2. The computer system 402, the client computing device 404, and/or the social network system 408 can communicate with each other over a network 410. The network can be any of a variety of appropriate communication networks, such as the Internet, a LAN, a WAN, 3G/4G network, wireless network, cellular network, fiber optic network, or any combination thereof.

The client computing device 404 includes an input subsystem 412 that receives input from one or more users of the client computing device 404. The input subsystem 412 can include a variety of input devices, such as a keyboard, microphone, touchscreen, trackball, mouse, and/or touchpad. The input subsystem 412 can receive user input that instructs the device 404 to request that the computer system 402 designate and/or modify a group of users based on an electronic photograph. The client computing device 404 also includes an output subsystem 414 that provides output on the device 404, such as a display and/or audio speakers.

The client computing device 404 can also include a digital camera 416 that takes electronic photographs that can be provided to the computer system 402 for group management. The client computing device 404 can also include one or more input/output (I/O) interfaces 418 that receive input from and/or provide output to other computing and/or electronic devices, such as communicating with the computer system 402 over the network 410. The I/O interface can include a variety of interfaces, such as an Ethernet card, a wireless network card, and/or a universal serial bus (USB) port. The client computing device 404 can receive and/or provide electronic photographs using the I/O interface 418. For instance, the client computing device 404 can be used to establish a connection with a digital camera that is external to the client computing device 404 and to receive electronic photographs from such an external camera.

The client computing device 404 is further depicted as including a GPS unit 420, an accelerometer 422, and a proximity information module 424. The GPS unit 420 can obtain geographic location information for the client computing device 404. The accelerometer 422 can sense movement of the computing device 404, such as the computing device 404 being physically contacted with another computing device. The GPS unit 420 and/or the accelerometer 422 can provide information to the proximity information module 424, which collects, analyzes, and provides proximity information to the computer system 402. The proximity information module 424 can also obtain information that can form the basis of proximity information from other sources, such as the I/O interface 418 which can provide information regarding local communication with other computing devices.

The client computing device 404 is also depicted as including a group management client 426 that, based on input from a user of the device 404, interacts with the computer system 402 over the network 410 to request the designation and/or modification of groups based on various electronic photographs. The group management client 426 can provide one or more electronic photographs taken by the digital camera 416 and/or stored in a local photograph repository 428 to the computer system 402 to use for creating and/or modifying groups of users. The group management client 426 can also, or alternatively, identify an electronic photograph that has already been provided to the computer system 402 (or that is accessible on another computer system, such as the social network system 408, through the network 408) for use creating and/or modifying groups of users.

The group management client 426 can also provide information regarding one or more users of the client computing device 404 to the computer system 402. Such user information can include information that uniquely identifies the one or more users, such as a social network id, a user account id, and/or an email address. User information can be stored locally by the client computing device 404, such as in a user information repository 430. User information can be stored and/or provided by the client computing device 404 based on prior user consent to such information being stored and/or provided by the client computing device 404.

The social network system 408 can host one or more social networks and can provide social network information (e.g., information regarding acquaintance relationships between users) to the computer system 402. The social network system 408 includes an I/O interface 432 through which the social network system 408 communicates with other computing devices, such as the client computing device 404 and/or the computer system 402, over the network 410. The social network system 408 also includes one or more social network servers 434 that serve requests for social network information to other computing devices, such as the computer system 402. The social network system 408 can store and retrieve social network information from a social network data repository 436.

The computer system 402 includes a group manager 440 that manages groups based on electronic photographs, a user identification module 442 that identifies users depicted in electronic photographs, and a user verification module 444 that verifies the authenticity of electronic photographs and/or the users who have been identified from electronic photographs. The group manager 440 includes a group creation module 446 that creates groups of users based on electronic photographs. The group creation module 446 can perform operations described above with regard to the creation of the group 120 by the computer system 104. The group manager 440 also includes a group modification module 448 that modifies preexisting (previously created) groups of users based on electronic photographs. The group modification module 448 can perform operations described above with regard to the modification of the group 318 by the computer system 302.

The user identification module 442 includes a facial recognition unit 450 that identifies users depicted in electronic photographs using facial recognition techniques. To identify users in electronic photographs the facial recognition unit 450 can use user information, such as photographs of users and/or facial models of users. Such user information can be stored in and retrieved from a user information data repository 458. The user identification module 442 can also include a metadata analysis unit 452 that analyzes metadata (e.g., tags) associated with electronic photographs to identify users depicted in the photographs.

The user verification module 444 includes a proximity information analyzer 454 that analyzes proximity information from client computing devices, such as the client computing device 404, to verify the authenticity of electronic photographs and users identified as being depicted in photographs. The user verification module 444 also includes a social network information analyzer 456 that analyzes social network information to verify the authenticity of electronic photographs and users identified as being depicted in photographs. The proximity information analyzer 454 and/or the social network information analyzer 456 can perform operations similar to those discussed above with regard to the computer system 204 in FIG. 2.

The group manager 440 can store and/or retrieve information regarding groups of users in a group information data repository 460, which can be similar to the group information data repositories 118 and 226 described above with regard to FIGS. 1 and 2, respectively.

In some implementations, the computer system 402 can be part of the social network system 408. For example, the computer system 402 can manage groups of users for one or more social networks hosted by the social network system 408 based on electronic photographs uploaded to the one or more social networks by users.

Figure 5:
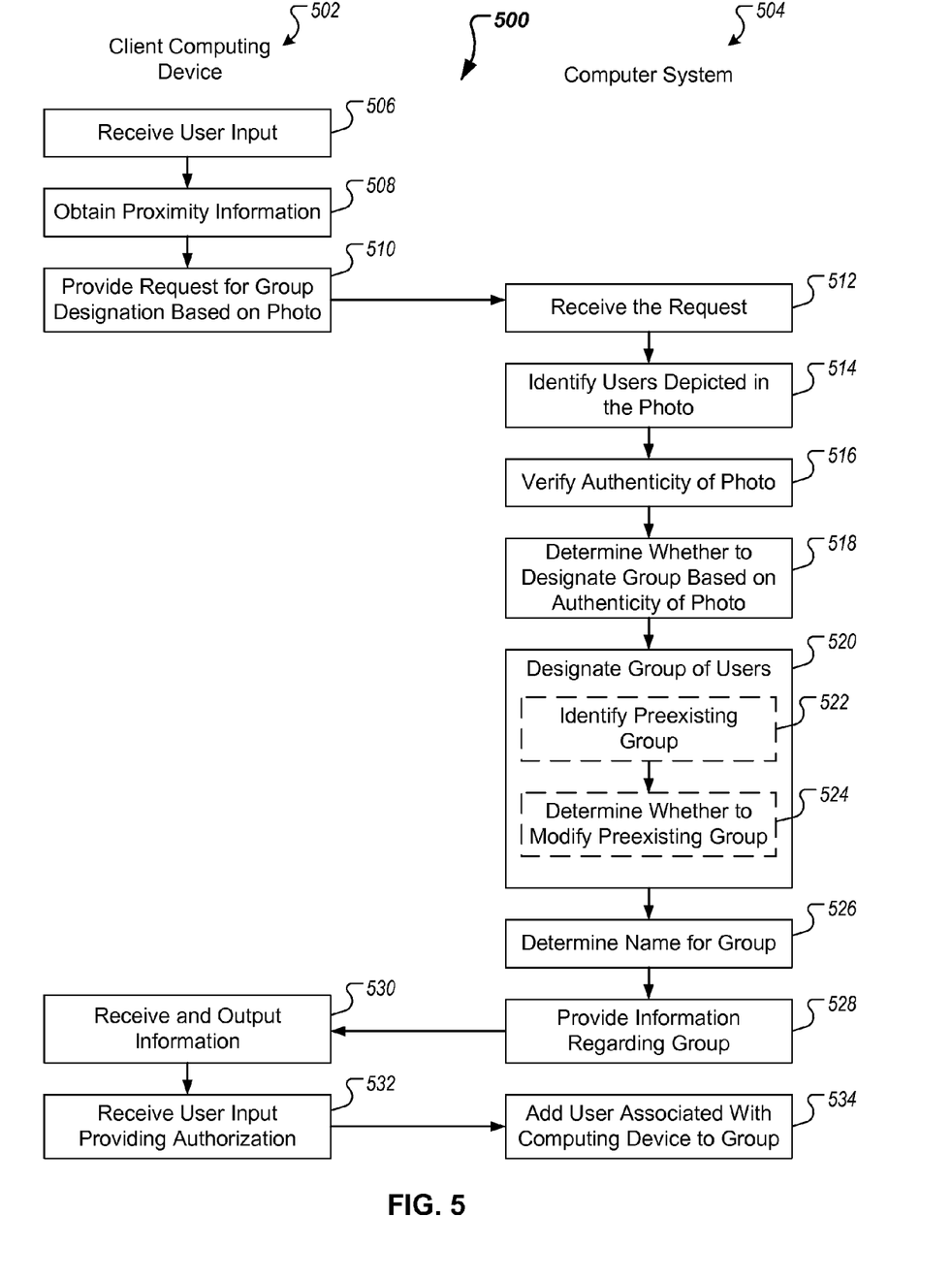
FIG. 5 depicts an example technique for designating groups of users based on electronic photographs.

FIG. 5 depicts an example technique 500 for designating groups of users based on electronic photographs. The example technique 500 is depicted as being performed by a client computing device 502 and a computer system 504. The client computing device 502 can be any of a variety of appropriate computing device, such as the computing devices 102a-f described with regard to FIG. 1, the computing devices 202a-c described with regard to FIG. 2, and/or the client computing device 404 described with regard to FIG. 4. The computer system 504 can be any of a variety of appropriate computer system, such as the computer system 104 described with regard to FIG. 1, the computer system 204 described with regard to FIG. 2, the computer system 302 described with regard to FIG. 3, and/or the computer system 402 described with regard to FIG. 4. Although the steps for the example technique 500 are depicted as being performed by the computing device 502 or the computer system 504, each of these steps may be performed by the device 502, the system 504, and/or other computing devices not depicted.

At 506, the client computing device 502 receives input from a user of the client computing device 502 instructing that a group of users be generated from an electronic photograph. For instance, the may select an option to designate a group of users that is provided in association with an electronic photograph. In response to receiving the user input, the client computing device 502 can obtain proximity information (508). As described above with regard to FIG. 2, the client computing device 502 can obtain information that identifies a geographic location for the client computing device 502 (e.g., GPS information) and/or information that identifies computing devices located in or around the client computing device 502 (e.g., devices connected locally to the computing device 502). The client computing device 502 may have previously obtained such information at a time when the electronic photograph associated with the user input was taken. In such cases, the client computing device 502 can obtain relevant proximity information for the electronic photograph from a data repository accessible to the client computing device 502. With the proximity information obtained, the client computing device can provide a request to the computer system 504 for a group of users to be designated based on the requested electronic photograph (510). In conjunction with the request, the client computing device 502 can provide the obtained proximity information and/or information identifying a user of the client computing device 502 (e.g., social network id, email address).

At 512, the computer system 504 receives the request form the client computing device 502. The computer system 504 may receive the requested electronic photograph with the request or may receive an identifier for the requested photograph from the client computing device 502 with which the computer system 504 can obtain the requested photograph. The computer system 504 can then identify users depicted in the requested photograph (514), as described above with regard to FIG. 1, and can verify the authenticity of the photograph and/or the users depicted in the photograph (516), as described above with regard to FIG. 2.

The computer system 504 can determine whether designate a group based on the authenticity of the requested photograph (518). For instance, if there is less than a threshold probability that the photograph is authentic (e.g., less an 50% probability, less than 75% probability, less than 90% probability), then the computer system 504 can determine that a group should not be designated and can inform the client computing device 502 (not depicted).

At 520, the computer system 504 designates a group of users based on the users identified and/or verified as being in the requested electronic photograph. Such designation can involve modifying a preexisting (e.g., previously designated) group of users to include additional users who are depicted in the requested electronic photograph. The designated group can include the identified users who have been verified as being authentically depicted in the photograph. The designated group may include a user requesting designation of the group regardless of whether the user is depicted in the photograph.

In some implementations, the computer system 504 identifies one or more preexisting groups to which the requested photograph may apply (522). For instance, the computer system 504 can examine whether there is at least a threshold a percentage of users identified in the photograph that are members of a preexisting group. Preexisting groups of users meeting such a threshold can be identified as candidates for modification. The computer system 504 can determine whether to modify such identified groups of users (524). Such a determination can be based on a variety of factors, such as a number of connections between members of a preexisting group and users identified in the requested electronic photograph who are not members of the preexisting group. Such connections can include a variety of information that may indicate that the users who are not members of the group are likely to be acquainted with the members of the group. For example, connections can include acquaintance relationships on a social network between users who are not members of a preexisting group and the members of the preexisting group. In another example, connections can include other electronic photographs in which users who are not members of a preexisting group and members of the preexisting group appear together. A determination that there is at least a threshold number of connections between non-members and members of a group can cause the computer system 504 to modify a preexisting group to include the non-members.

The computer system can determine a name for the designated group, if one does not exist or has not been provided for the group (526). For example, the computer system 504 can analyze metadata associated with the requested photograph to suggest a name for the group. In another example, the computer system 504 can optically analyze the requested photograph to identify objects and/or scenery that may suggest an appropriate name for the group.

At 528, the computer system can provide information regarding the group to the client computing device 502 (and/or to other computing devices associated with users identified for addition to the group of users). Such information can include information requesting authorization from a user to designate the group and/or for the group to include one or more of the identified users. Users may not be added to the group unless they have provided authorization.

The client computing device 502 receives the information from the computer system 504 and outputs the information to a user of the device 502 (530). The information can be output with a user interface so that a user can provide input to the device 502 indicating whether they consent to the group designation and/or user membership in the group. The client computing device 502 receives user input regarding authorization and provides an indication regarding authorization to the computer system 504 (532). The computer system 504 receives the indication from the client computing device 502 and, based on the received indication, adds one or more users associated with the client computing device 502 to the designated group (534).

Figure 6:
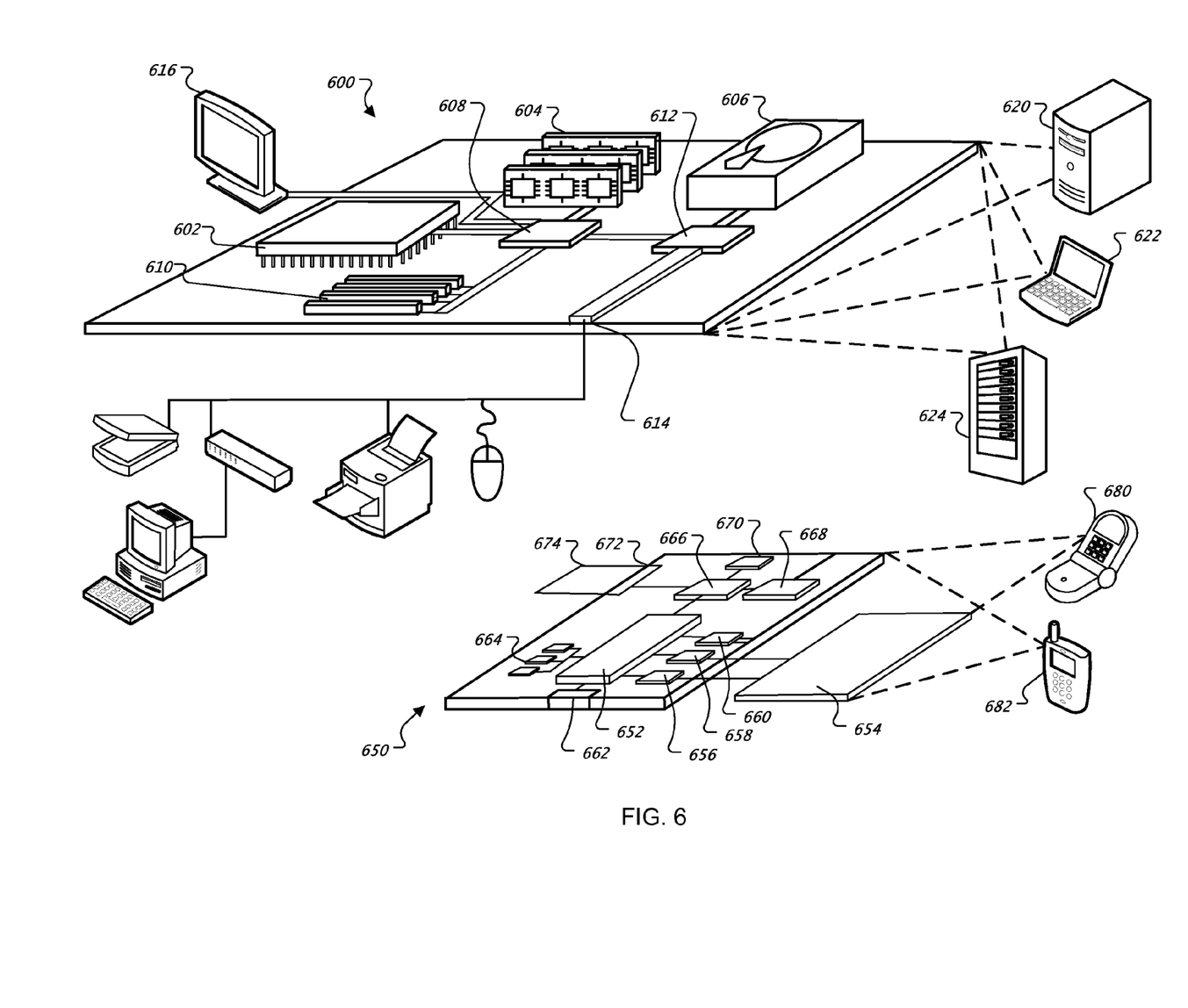
FIG. 6 is a block diagram of computing devices that may be used to implement the systems and methods described in this document, as either a client or as a server or plurality of servers.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. Additionally computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for designating groups may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:
1. A computer-implemented method comprising:
receiving, at a computer system, an electronic photograph;
identifying, by the computer system analyzing the electronic photograph, a plurality of users depicted in the electronic photograph;
designating a group of users based on the identified plurality of users;
providing information regarding the designated group of users to one or more computing devices associated with one or more of the plurality of users;

verifying the authenticity of the electronic photograph based on proximity information associated with the plurality of users; and determining whether to designate the group of users based on the authenticity of the electronic photograph.

2. The computer-implemented method of claim 1, wherein the designated group of users includes the plurality of users.

3. The computer-implemented method of claim 2, wherein the electronic photograph is received from a computing device that is associated with a first user; and wherein the group of users is designated to additionally include the first user based on the electronic photograph having been received from the computing device that is associated with the first user.

4. The computer-implemented method of claim 1, wherein the provided information indicates that the group of users has been designated and requests authorization from the one or more of the plurality of users for the one or more of the plurality of users to be included in the group of users.

5. The computer-implemented method of claim 4, further comprising:

receiving authorization from the one or more of the plurality of users to be included in the group of users; and adding the one or more of the plurality of users to the group of users in response to receiving the authorization.

6. The computer-implemented method of claim 1, wherein the information associated with the plurality of users comprises social network information indicating acquaintance relationships on a social network for the plurality of users.

7. The computer-implemented method of claim 1, wherein the information associated with the plurality of users comprises proximity information indicating that at least a portion of the plurality of users were located within a threshold distance of a particular physical location within a threshold amount of time of the electronic photograph being taken.

8. The computer-implemented method of claim 7, wherein the proximity information comprises information indicating one or more local communication connections between computing devices associated with the at least a portion of the plurality of users within the threshold amount of time of the electronic photograph being taken.

9. The computer-implemented method of claim 7, wherein the proximity information comprises information indicating that the at least a portion of the plurality of users physically contacted their computing devices together within the threshold amount of time of the electronic photograph being taken.

10. The computer-implemented method of claim 7, wherein the proximity information comprises geographic location information indicating geographic locations for the at least a portion of the plurality of users within the threshold amount of time of the electronic photograph being taken.

11. The computer-implemented method of claim 1, further comprising:

identifying a preexisting group of users based on the plurality of users identified from the electronic photograph;

determining whether to modify the preexisting group of users based on at least a comparison of the identified plurality of users and users included in the one or more preexisting groups; and wherein designating the group of users comprises modifying the preexisting group of users based on the determination of whether to modify the preexisting group of users, the designated group of users comprising the preexisting group of users with one or more modifications.

12. The computer-implemented method of claim 11, wherein the one or more modifications comprises at least one user from the plurality of users being added to the preexisting group of users.

13. The computer-implemented method of claim 11, wherein the determination of whether to modify the preexisting group of users is further based on connections between (i) a user from the plurality of users who is not a member of the preexisting group of users and (ii) members of the preexisting group of users.

14. The computer-implemented method of claim 13, wherein the connections comprise acquaintance relationships on a social network between the user who is not a member of the preexisting group of users and the members of the preexisting group of users.

15. The computer-implemented method of claim 13, wherein the connections comprise one or more other electronic photographs in which the user who is not a member of the preexisting group of users and members of the preexisting group of users appear.

16. The computer-implemented method of claim 1, further comprising determining a name for the designated group of users based on one or more objects depicted in the electronic photograph or based on information received in association with the electronic photograph that indicates the content of the electronic photograph.

17. A computer-implemented method comprising:

receiving, at a computing device, user input that indicates a first request for a group of users to be designated based on identifying users in an electronic photograph;

in response to receiving the user input, obtaining proximity information for one or more other computing devices that were physically located within a threshold distance of the computing device within a threshold amount of time of the electronic photograph being taken;

providing a second request to a computer system for a group of users to be designated as authentic based on an analysis for verification of the electronic photograph using the obtained proximity information; and receiving information indicating that the group of users has been designated as authentic by the computer system to include the plurality of users identified based on the electronic photograph and the proximity information.

18. The computer-implemented method of claim 17, wherein the proximity information comprises geographic location information indicating geographic locations for the at least a portion of the plurality of users within the threshold amount of time of the electronic photograph being taken.

19. A system comprising:

a computer system;

an interface to the computer system to receive an electronic photograph;

a user identification module of the computer system to identify a plurality of users depicted in the electronic photograph by analyzing the electronic photograph;

a group manager of the computer system to designate a group of users based on the plurality of users identified by the user identification module; and a verification module of the computer system to verify the authenticity of the electronic photograph based on proximity information associated with the plurality of users, wherein the verification module determines whether to designate the group of users based on the authenticity of the electronic photograph, and wherein the interface further provides information regarding the designated group of users to one or more computing devices associated with one or more of the plurality of users.

20. The system of claim 19, wherein the information associated with the plurality of users includes proximity information.

* * * * *